United States Patent [19]

Atsuta

[11] Patent Number: 5,134,333
[45] Date of Patent: Jul. 28, 1992

[54] VIBRATION WAVE DRIVEN MOTOR

[75] Inventor: Akio Atsuta, Yokohama, Japan

[73] Assignee: Canon Kabushiki Kaisha, Tokyo, Japan

[21] Appl. No.: 649,903

[22] Filed: Feb. 1, 1991

[30] Foreign Application Priority Data

Feb. 2, 1990 [JP] Japan .................... 2-23792

[51] Int. Cl.$^5$ .......................................... H01L 41/08
[52] U.S. Cl. ................................................... 310/323
[58] Field of Search ................................... 310/323, 325

[56] References Cited

U.S. PATENT DOCUMENTS

| | | | |
|---|---|---|---|
| 4,479,070 | 10/1984 | Frische et al. | 310/338 |
| 4,580,073 | 4/1986 | Okumura et al. | 310/323 |
| 4,587,452 | 5/1986 | Okumura et al. | 310/328 |
| 4,634,915 | 1/1987 | Mukohjima et al. | 310/323 |
| 4,649,311 | 3/1987 | Mukohjima et al. | 310/323 |
| 4,692,649 | 9/1987 | Izukawa et al. | 310/323 X |
| 4,713,571 | 12/1987 | Suzuki | 310/316 |
| 4,749,896 | 6/1988 | Suzuki | 310/316 |
| 4,771,203 | 9/1988 | Mukohjima et al. | 310/323 |
| 4,833,358 | 5/1989 | Suzuki et al. | 310/316 |
| 4,882,500 | 11/1989 | Iijima | 310/323 |
| 4,954,741 | 9/1990 | Furutsu | 310/316 |

FOREIGN PATENT DOCUMENTS

| | | | |
|---|---|---|---|
| 3415628 | 10/1984 | Fed. Rep. of Germany . | |
| 3415630 | 10/1984 | Fed. Rep. of Germany . | |
| 0135369 | 6/1986 | Japan | 310/323 |
| 62-147974 | 7/1987 | Japan | 310/323 |
| 0190570 | 8/1988 | Japan | 310/323 |
| 0012881 | 1/1989 | Japan | 310/323 |
| 2149570 | 6/1985 | United Kingdom . | |
| 2183371 | 6/1987 | United Kingdom . | |

*Primary Examiner*—Mark O. Budd
*Attorney, Agent, or Firm*—Fitzpatrick, Cella, Harper & Scinto

[57] ABSTRACT

This invention relates to a vibration type motor in which frequency signals differing in phase from each other are applied to an electro-mechanical energy conversion element disposed on a vibration member to thereby vibrate the vibration member and drive a movable member by the vibration force. This invention provides a motor of the described type in which a monitoring portion for detecting the vibrated state of the vibration member is provided at a location avoiding a location at which the rigidity of the vibration member exhibits rigidity differing from the rigidity of the entire vibration member so that the vibrated state can be accurately detected.

17 Claims, 4 Drawing Sheets

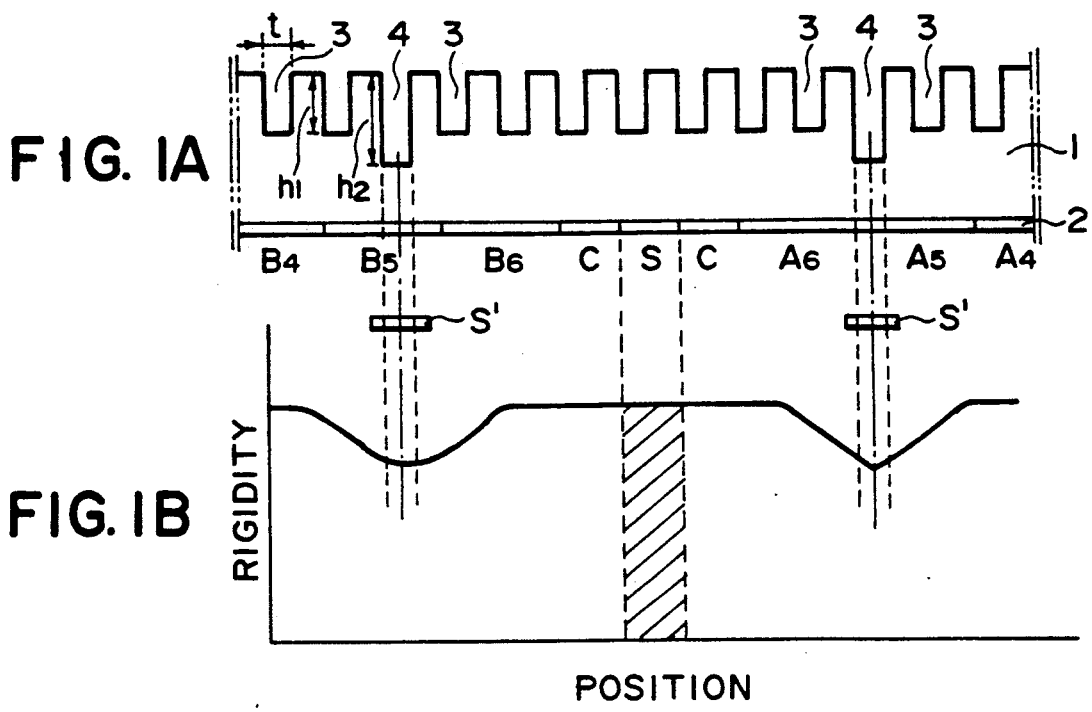
FIG. 1A
FIG. 1B
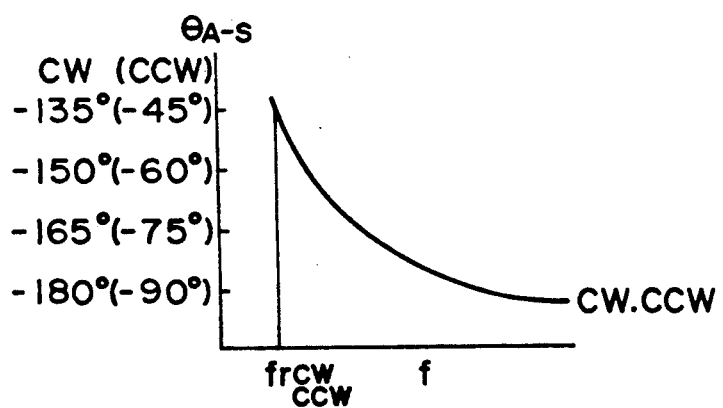
FIG. 2

■ DEEP GROOVE
▨ SHALLOW GROOVE

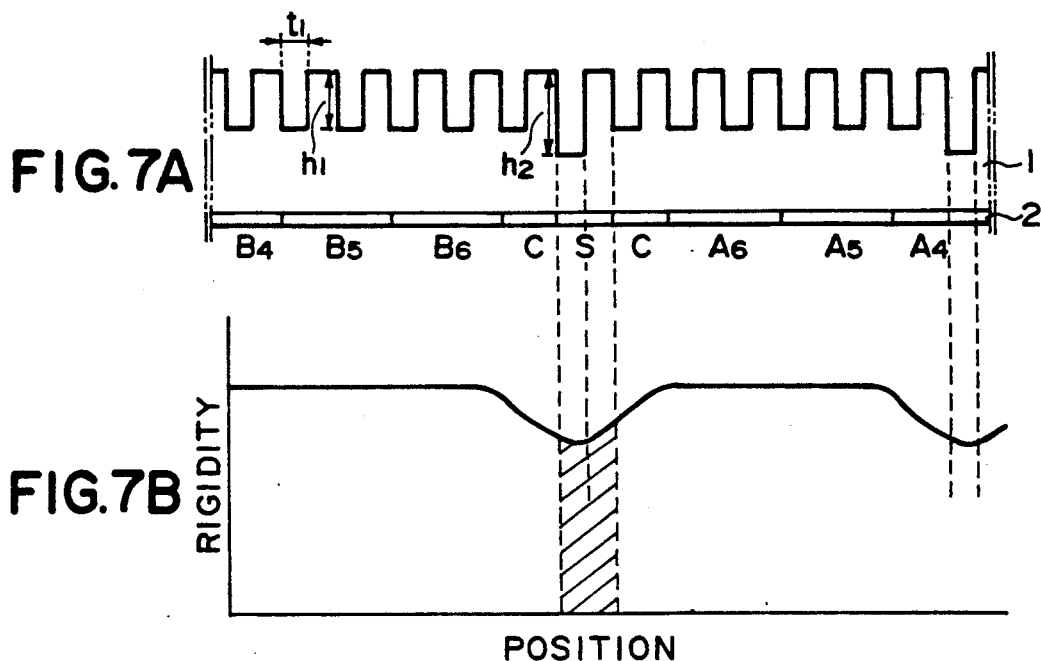
FIG. 7A
FIG. 7B
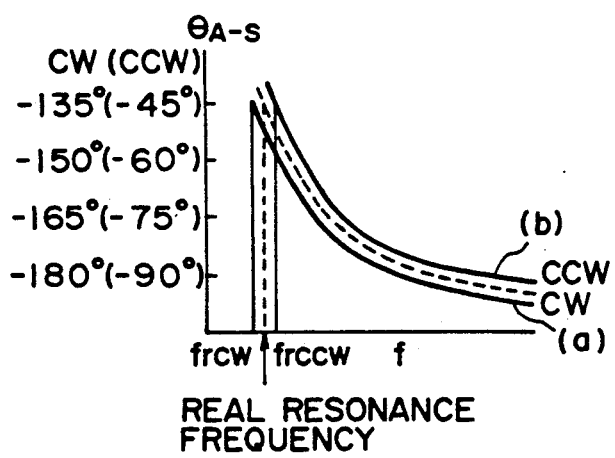
FIG. 8

VIBRATION WAVE DRIVEN MOTOR

BACKGROUND OF THE INVENTION

1. Field of the Invention

This invention relates to a vibration type motor in which a vibration member and a member which is in contact with the vibration member are moved relative to each other by vibration generated in the vibration member.

2. Related Background Art

FIG. 6 of the accompanying drawings shows the electrode arrangement of a piezo-electric element provided on the resilient member of a circular ring-shaped vibration wave driven motor according to the prior art. As shown, two groups of electrodes [A phase ($A_1$–$A_6$)] and B phase ($B_1$–$B_6$) having a pitch of ½ of the wavelength of a vibration wave excited in a circular ring-shaped vibration member are spatially disposed with a pitch ¼, i.e., with a phase deviation of ¼ of said wavelength, and a sensor electrode S for detecting the vibrated state of the circular ring-shaped vibration member, i.e., an electrode such as a piezo-electric element generating an electromotive voltage by the vibration of the vibration member, and common electrodes C ($C_1$, $C_2$ and $C_3$) are further provided between these two groups of electrodes. The vibration member comprises a resilient member of a metal or like material and a piezo-electric element (e.g. PZT) as an electro-mechanical energy conversion element attached to the resilient member, and the associated electrode of the electro-mechanical energy conversion element which is adjacent to the resilient member is short-circuited through the metallic resilient member. The common electrodes $C_1$, $C_2$ and $C_3$ are rendered conductive with the resilient member by an electrically conductive paint or the like, and the potential difference from the resilient member is zero. When a potential of a certain magnitude relative to the potential of the common electrodes C is input to driving electrodes $A_1$–$A_6$ and $B_1$–$B_6$, a potential difference is produced between the front and back of the electro-mechanical energy conversion element and strain is created. Signs − and + shown on the electrodes indicate the directions of polarization of the piezo-electric elements in the electrode portions.

By a voltage $V = V_0 \sin \omega t$ being applied to the group of A phase electrodes $A_1$–$A_6$ and a voltage $V = V_0 \sin(\omega t \pm \pi/2)$ being applied to the group of B phase electrodes $B_1$–$B_6$, a travelling vibration wave is generated in the resilient member and a conventional movable member (not shown) such as a rotor which is in pressure contact with the resilient member is moved by friction. Also, by changing the signs (+) and (−) in the aforementioned equation, i.e., advancing or delaying the phase of one of the applied voltages with respect to that of the other, it is possible to change the direction of movement of the movable member, and in the case of (−), i.e., where a frequency voltage delayed in phase by $\pi/2$ (90°) with respect to the frequency voltage applied to the A phase is applied to the B phase, the movable member is rotated clockwise (CW), and in the case of (+), i.e., where a frequency voltage advanced in phase by $\pi/2$ (90°) with respect to the frequency voltage applied to the A phase is applied to the B phase, the movable member is rotated counter-clockwise (CCW).

A signal detected from the sensor electrode S is a signal having a certain phase relation with the frequency voltage applied to the A phase when the movable member is in a resonance state, but it becomes a signal deviating from said certain phase relation with the frequency voltage applied to the A phase when the movable member is in a non-resonance state. So, by detecting the phase difference between the driving voltage and the detection signal, it is possible to know whether the vibration is in a resonance state of great amplitude or how much the vibration deviates from a resonance state, and by determining from this information the frequency to be applied, the control of the rotational speed is possible.

FIG. 7A of the accompanying drawings is a fragmentary cross-sectional view of the resilient member of the vibration wave driven motor. A piezo-electric element 2 as an electro-mechanical energy conversion element is attached to the resilient member 1 of FIG. 7A. Symbols below the element 2 represent the positions of the electrodes of FIG. 6. A number of grooves each having a width $t_1$ and a depth $h_1$ are formed in the surface of contact of the resilient member with the rotor (not shown) over the entire circumference thereof. Some of these grooves are deep grooves of a depth $h_2$ to prevent the creation of noise.

The spacing between the deep grooves of FIG. 7A may be suitably selected, but if this spacing is 60°, the vibration of the 3rd-order mode can be suppressed. As described above, the arrangement of the deep grooves gives birth to the effect of suppressing a single or a number of modes of noise and thus preventing noise.

At this time, the electrode pattern of the piezo-electric element which is an electro-mechanical energy conversion element and the pattern of said deep grooves are arbitrarily positioned.

In the case of the combination of the sensor electrodes S and the deep groove pattern as shown in FIG. 7A, the deep groove portion is near the sensor electrode S, and as shown in FIG. 7B of the accompanying drawings, the rigidity of the portion of the sensor electrode S varies. At this time, there is obtained the relation of the frequency f vs. the phase difference $\theta_{A-S}$ between the A phase and S phase as shown in FIG. 8 of the accompanying drawings. When the frequency of the resilient member is a resonance frequency, the phase difference $\theta_{A-S}$ is −135° for CW and −45° for CCW.

However, since the rigidity of the portion near the sensor electrode S varies as shown in FIG. 8, the amplitude and wavelength of the travelling vibration wave change delicately, and the CW rotation and the CCW rotation deviate from each other in opposite directions with respect to the ideal f vs. $\theta_{A-S}$ curve (the portion indicated by dotted line in FIG. 8).

Consequently, there is the problem that a right resonance frequency is not detected even if the $\theta_{A-S}$ phase difference is adjusted to −135° (for CCW, −45°). That is, in the example of the prior art described above, if the positional relation between the electrode pattern of the piezo-electric element which is an electro-mechanical energy conversion element and the deep groove pattern of the resilient member is arbitrary, the portion in which the rigidity of the deep groove portion varies is disposed near the sensor electrode S as shown in FIG. 7B, and this adversely affects the signal of the sensor electrode S and thus, a difference occurs relative to the true f vs. $\theta_{A-S}$ curve, as shown in FIG. 8. That is, near the deep grooves, strain differs and the center of the electrode for a sensor becomes as if it deviated and thus, it follows that a right resonance frequency is not detected.

SUMMARY OF THE INVENTION

One aspect of the application is to solve the above-noted problem peculiar to the prior art and to provide a vibration type motor in which a sensor electrode always enables the detection of a right resonance frequency.

One aspect of the application is to provide a vibration type motor in which an electro-mechanical energy conversion element having at least a driving electrode and a vibration detecting electrode is disposed in a single layer of a plurality of layers on a resilient member and frequency voltages differing in phase from each other are applied to the driving electrode to generate a travelling vibration wave, whereby said resilient member and a member which is in pressure contact with said resilient member are moved relative to each other, and wherein said vibration detecting electrode is disposed at the center of that portion of said resilient member in which the rigidity of said resilient member varies, or avoiding that portion in which the rigidity of said resilient member varies.

One aspect of the application is to provide a vibration type motor in which an electro-mechanical energy conversion element is disposed on a vibration member and a frequency signal is applied to said element to vibrate said vibration member and the vibration force of said vibration member is used as a drive force and wherein a sensor electrode for detecting the vibrated state of the motor is disposed in a portion wherein the variation in the rigidity of the vibration member is small or a portion wherein the variation in the rigidity of the vibration member occurs symmetrically with respect to the sensor electrode, whereby the vibration state of the motor is made accurately detectable.

Other objects of the present invention will become apparent from the following detailed description of some embodiments of the invention taken in conjunction with the accompanying drawings.

BRIEF DESCRIPTION OF THE DRAWINGS

FIG. 1 shows Embodiment 1 of a vibration wave driven motor according to the present invention, FIG. 1A being a fragmentary cross-sectional view of a resilient member, and FIG. 1B being a graph showing the relation between the position and rigidity of the resilient member.

FIG. 2 is a graph showing the f vs. $\theta_{A-S}$ relation of Embodiment 1.

FIG. 7 shows the vibration wave driven motor according to the prior art, FIG. 7A being a fragmentary cross-sectional view of a resilient member, and FIG. 7B being a graph showing the relation between the position and rigidity of the resilient member.

FIG. 8 is a graph showing the f vs. $\theta_{A-S}$ relation in the example of the prior art.

DESCRIPTION OF THE PREFERRED EMBODIMENTS

Embodiment 1

Figure 6:
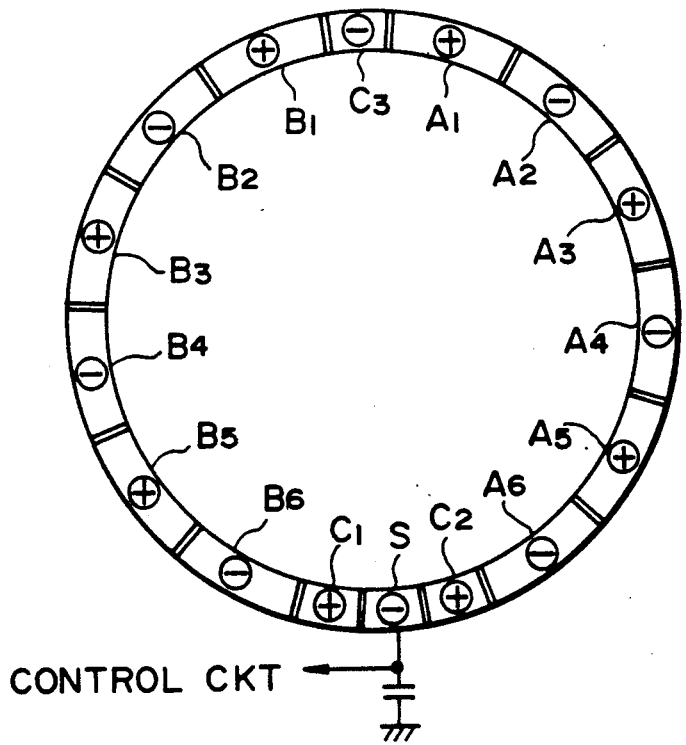
FIG. 6 shows the electrode arrangement in a vibration wave driven motor according to the prior art.

FIG. 1 shows Embodiment 1 of a vibration type motor according to the present invention, FIG. 1A being a fragmentary cross-sectional view of a piezo-electric element 2 and a resilient member 1 near a sensor electrode S, and FIG. 1B being a graph representing the rigidity at the same position. The disposition of the piezo-electric element and electrodes is similar to that shown in FIG. 6.

Referring to FIG. 1A, the resilient member 1 is formed with first grooves 3 each having a width t and a depth $h_1$. Also, deep grooves 4 each having a depth $h_2$ are formed in place of some of these grooves 3. As shown in FIG. 1B, the rigidity of the resilient member 1 varies near the deep grooves 4. However, the sensor electrode S is disposed away from or avoiding the deep grooves 4 and therefore, the rigidity of the resilient member 1 is uniform.

Here, the frequency (f) vs. phase difference $\theta_{A-S}$ curve of a sensor signal obtained from the sensor electrode S when a voltage V=Vo sin wt is applied to driving A phase electrodes $A_1$-$A_6$ and a voltage V=Vo sin ($\omega t \pm \pi/2$) is applied to driving B phase electrodes $B_1$-$B_7$ is as shown in FIG. 2. That is, it is seen from FIG. 2 that the phase difference $\theta_{A-S}$ at a regular resonance frequency fr has a difference of 90°, i.e., −135° in the case of CW rotation and −45° in the case of CCW rotation, but the frequency f vs. phase difference $\theta_{A-S}$ curve coincides at all frequencies.

By the sensor electrode S being disposed avoiding the portion in which the rigidity of the resilient member 1 varies as described above, the resonance frequency can be detected correctly. Empirically, it is desirable that the amount by which the portion in which the rigidity variation is avoided be λ (wavelength)/4 or more from the portion in which the rigidity is lowest (or highest). Also, where the sensor electrode S is disposed at the center of the portion in which the rigidity varies, it is desirable that said amount be λ (wavelength)/8 or less.

That is, if the sensor electrode is disposed at the center of the portion in which the rigidity varies, as indicated at a position S′ in FIG. 1, the vibration state can be accurately detected because the variation in the rigidity occurs symmetrically with respect to the sensor electrode.

Embodiment 2

Figure 3A:
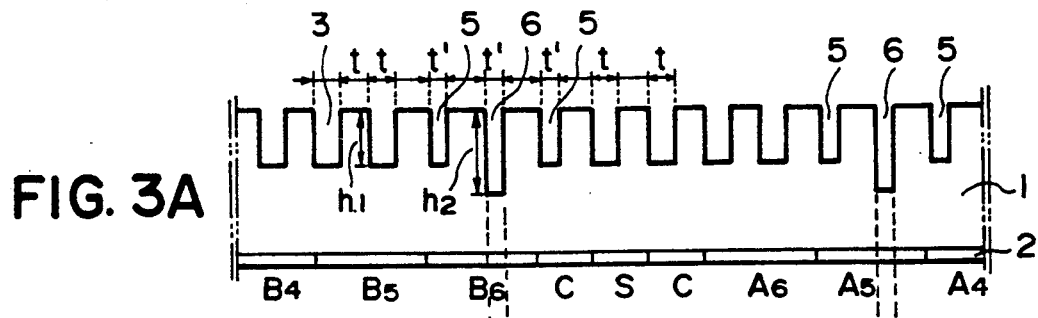
FIG. 3 shows Embodiment 2, FIG. 3A being a fragmentary cross-sectional view of a resilient member, and FIG. 3B being a graph showing the relation between the position and rigidity of the resilient member.
Figure 3B:
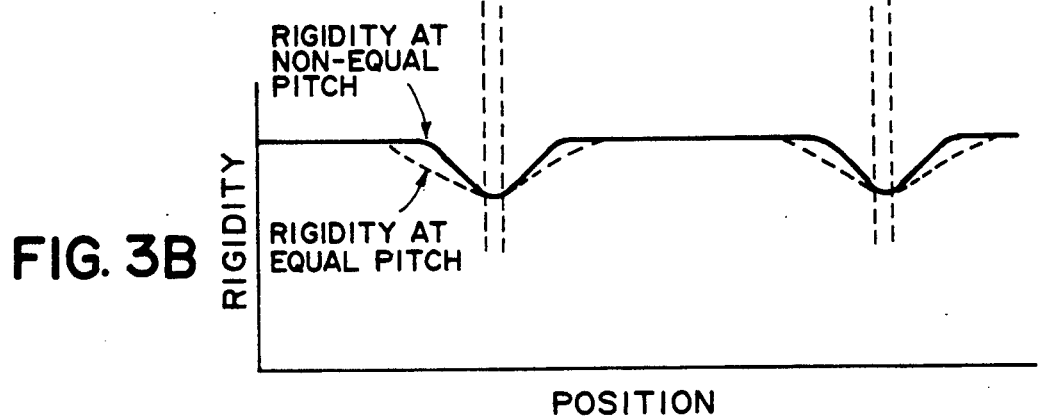

FIG. 3 shows Embodiment 2 of the present invention, FIG. 3A being a fragmentary cross-sectional view of a piezo-electric element 2 and a resilient member 1 near a sensor electrode S, and FIG. 3B being a graph representing the rigidity at the same position.

Referring to FIG. 3A, the resilient member 1 is formed with grooves 3 each having a width t and a depth $h_1$. Also, grooves 5 each having a depth $h_1$ and a width t′ and grooves 6 each having a depth $h_2$ and a width t′ are formed in place of some of these grooves 3. As can be seen from FIG. 3B, the area in which the rigidity of the resilient member varies is decreased by providing the grooves 5 and 6 having the width t′ and the depths $h_2$ and $h_1$, and the sensor electrode S can readily avoid the portion in which the rigidity varies.

Embodiment 3

Figure 4A:
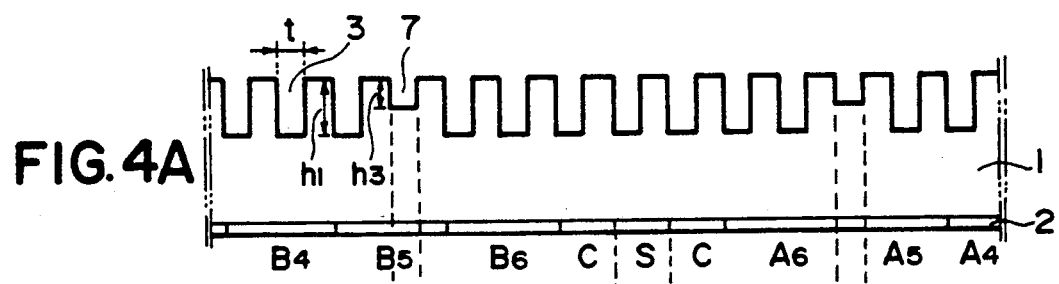
FIG. 4 shows Embodiment 3, FIG. 4A being a fragmentary cross-sectional view of a resilient member, and FIG. 4B being a graph showing the relation between the position and rigidity of the resilient member.
Figure 4B:
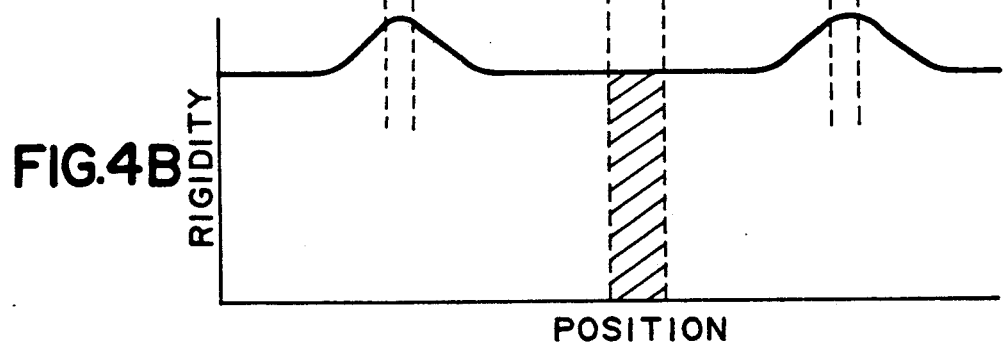

FIG. 4 shows Embodiment 3 of the present invention, FIG. 4A being a fragmentary cross-sectional view of a piezo-electric element 2 and a resilient member 1 near a sensor electrode S, and FIG. 4B being a graph representing the rigidity at the same position.

Referring to FIG. 4A, the resilient member 1 is formed with grooves 3 each having a width t and a depth $h_1$. Also, shallow grooves 7 each having a depth $h_2$ are formed in place of some of these grooves 3.

In Embodiment 1, the rigidity is varied by deepening some of the grooves, whereas in the present embodiment 3, the rigidity is varied by making the grooves 7 shallow.

The method of varying the rigidity of a portion of the resilient member 1 to thereby prevent the generation of noise can also be realized by attaching or removing a certain mass to or from a portion of the resilient member. Again in such cases, there exists a portion in which the rigidity varies and therefore, as in Embodiment 1, the sensor electrode S need be disposed avoiding that portion.

Embodiment 4

Figure 5:
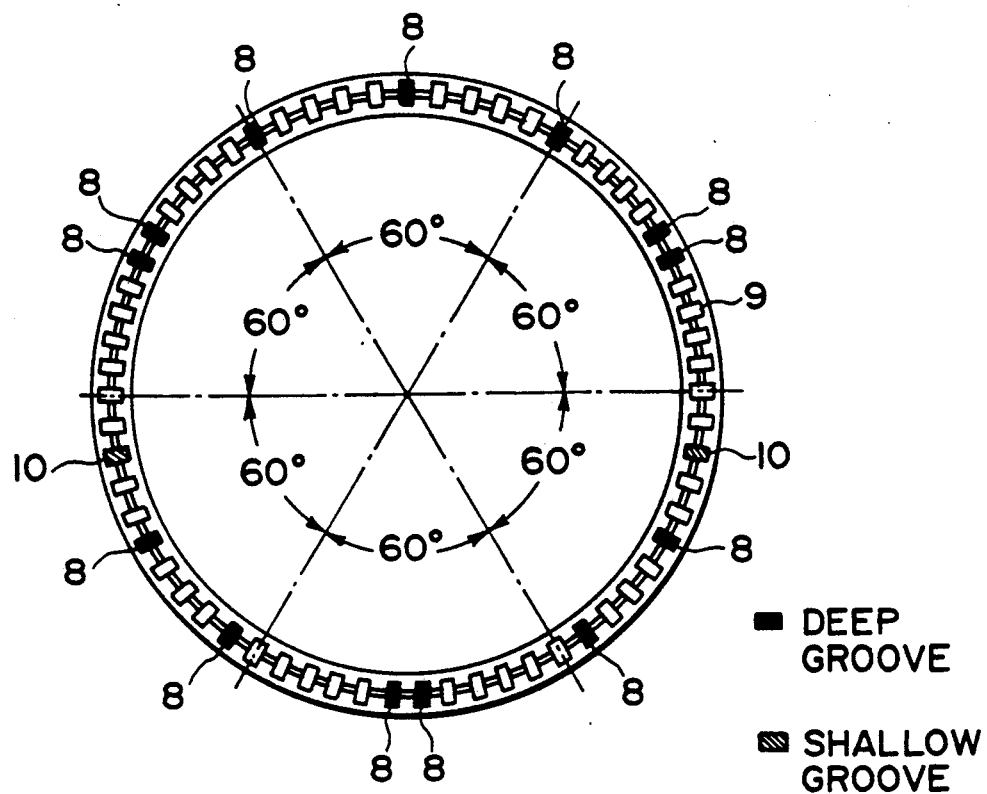
FIG. 5 is a plan view of a resilient member showing Embodiment 4.

FIG. 5 shows Embodiment 4 of the present invention. In the present embodiment, grooves 8, 9 and 10 are at unequal pitches and the deep grooves 8 painted out in the figure are continuous at a unit of two. In FIG. 5, the rigidity of the resilient member varies most in the portions wherein two deep grooves 8 are continuous, and the sensor electrode S avoids particularly those portions. Also, it is desirable that the sensor electrode S be disposed avoiding the portions in which the deep grooves 8 and 10 are provided at one location each.

Each of the above-described embodiments is a circular ring-shaped resilient member, but the resilient member can also be made similar in a case where vibration detecting means is provided for a disk-shaped or linearly shaped resilient member. The number of the piezo-electric element which is an electro-mechanical energy conversion element is not limited to one, but piezo-electric elements may be provided in multiple layers.

As described above, according to the present embodiment, the vibration detecting electrode is disposed avoiding the portion in which the rigidity of the resilient member varies, whereby the characteristic of the phase difference between the output of the vibration detecting electrode and the applied voltage can accurately catch the resonance frequency and can stably drive the motor.

The embodiments are shown as the type in which a travelling vibration wave is formed, but the present invention can be applied to any type in which a vibration member is vibrated by a piezo-electric element and a movable member is driven by the vibration of the vibration member.

I claim:

1. A vibration type motor comprising:
   (a) a vibration member formed with a plurality of slits or projected portions, said plurality of slits or projected portions including slits or projected portions having a first shape and at least one slit or projected portion having a second shape different from the first shape, the number of slits or projected portions having the first shape being greater than the number of slits or projected portions having the second shape;
   (b) an electro-mechanical energy conversion element portion provided on said vibration member, wherein frequency signals differing in phase from each other are applied to said element portion; and
   (c) a monitoring portion provided on said vibration member, said monitoring portion being disposed at a location away from said slits or projected portions having the second shape.

2. A vibration type motor according to claim 1, wherein said monitoring portion is comprised of a signal forming element portion provided on said vibration member for forming an electrical signal conforming to the vibration of said vibration member, and a detecting electrode provided on said element portion.

3. A vibration type motor according to claim 2, wherein said signal forming element portion comprises a part of said energy conversion element portion.

4. A vibration type motor according to claim 1, wherein said slits or projected portions having the first shape each have a slit length or a projection length of a first length and said slits or projected portions of the second shape each having a second length different from the first length.

5. A vibration type motor according to claim 1, wherein said electro-mechanical energy conversion element portion comprises piezo-electric elements.

6. A vibration type motor comprising:
   (a) a vibration member formed with a plurality of slits or projected portions, said plurality of slits or projected portions including slits or projected portions located at a predetermined first interval and slits or projected portions located at a predetermined second interval different from the first interval, the number of slits or projected portions located at the first interval being greater than the number of slits or projected portions located at the second interval;
   (b) an electro-mechanical energy conversion element portion provided on said vibration member, wherein frequency signals differing in phase from each other are applied to said element portion; and
   (c) a monitoring portion provided on said vibration member, said monitoring portion being disposed at a location away from the slits or projected portions disposed at the second interval.

7. A vibration type motor according to claim 6, wherein said monitoring portion is comprised of a signal forming element portion provided on said vibration member for forming an electrical signal conforming to the vibration of said vibration member, and a detecting electrode provided on said element portion.

8. A vibration type motor according to claim 7, wherein said signal forming element portion comprises a part of said energy conversion element portion.

9. A vibration type motor according to claim 6, wherein said electro-mechanical energy conversion element portion comprises piezo-electric elements.

10. A vibration type motor according to claim 6, wherein the shape of the slits or projected portions disposed at the first interval is different from the shape of the slits or projected portions disposed at the second interval.

11. A vibration type motor according to claim 6, wherein the length of the slits or projected portions disposed at the first interval is different from the length of the slits or projected portions disposed at the second interval.

12. A vibration type motor comprising:
(a) a vibration member formed with a plurality of slits or projected portions, said plurality of slits or projected portions including slits or projected portions having a first shape and at least one slit or projected portion having a second shape different from the first shape, the number of slits or projected portions of the first shape being greater than the number of slits or projected portions having the second shape;
(b) an electro-mechanical energy conversion element portion provided on said vibration member, wherein frequency signals differing in phase from each other are applied to said element portion; and
(c) a monitoring portion for detecting a vibration state of said vibration member, wherein a center of said monitoring portion is located in alignment with a center of a slit or projected portion of the second shape.

13. A vibration type motor according to claim 12, wherein said monitoring portion comprises a signal forming element portion provided on said vibration member for forming an electrical signal conforming to the vibration of said vibrating member, and a detecting electrode provided on said element portion.

14. A vibration type motor according to claim 13, wherein said signal forming element portion comprises a part of said energy conversion element portion.

15. A vibration type motor for producing drive power by applying frequency signals differing in phase to an electro-mechanical portion of a vibration member, said motor comprising:
(a) a vibration member including an electro-mechanical portion and a plurality of slits or projected portions, said plurality of slits or projected portions including slits or projected portions having a first shape and slits or projected portions having a second shape different from the front shape, the number of said slits or projected portions having the first shape being greater than the number of slits or projected portions having the second shape; and
(b) a monitoring portion provided in said vibration member, said monitoring portion being disposed at a location away from said slits or projected portions having the second shape.

16. A vibration type motor according to claim 30, wherein the length of the slits or projected portions disposed at the first interval is different from the length of the slits or projected portions disposed at the second interval.

17. A vibration type motor for producing a drive power by applying frequency signals differing in phase from each other to an electro-mechanical portion of a vibration member, said motor comprising:
(a) a vibration member including an electro-mechanical portion and a plurality of slits or projected portions, said plurality of slits or projected portions including slits or projected portions having a first shape and at least one slit or projected portion having a second shape different from the first shape, the number of slits or projected portions having the first shape being greater than the number of slits or projected portions having the second shape; and
(b) a monitoring portion for detecting a vibration state of said vibration member, wherein a center of said monitoring portion is located in alignment with a center of a slit or projected portion of the second shape.

* * * * *

UNITED STATES PATENT AND TRADEMARK OFFICE
CERTIFICATE OF CORRECTION

PATENT NO. : 5,134,333  Page 1 of 2
DATED : July 28, 1992
INVENTOR(S) : Atsuta It is certified that error appears in the above-identified patent and that said Letters Patent is hereby corrected as shown below:

COLUMN 1:

Line 17,   "] and B phase $(B_1-B_6)$" should read
                  --and B phase $(B_1-B_6)$]--.

COLUMN 8:

Line 4,   "front shape," should read --first shape,--.
    Prior to line 12, insert Claim 16, as follows:
            --16. A vibration type motor for producing drive power by applying frequency signals differing in phase from each other to an electro-mechanical portion of a vibration member, said motor comprising:
            (a) a vibration member including an electro-mechanical portion and a plurality of slits or projected portions, said plurality of slits or projected portions including slits or projected portions located at a predetermined first interval and slits or projected portions located at a predetermined second interval different from the first interval, the number of slits or projected portions located in the first interval being greater than the number of slits or projected portions located in the second interval; and
            (b) a monitoring portion provided in said vibration member, said monitoring portion being disposed at a location away from the slits or projected portions disposed at said second interval.--

UNITED STATES PATENT AND TRADEMARK OFFICE
CERTIFICATE OF CORRECTION

PATENT NO. : 5,134,333
DATED : July 28, 1992
INVENTOR(S) : Atsuta

It is certified that error appears in the above-identified patent and that said Letters Patent is hereby corrected as shown below:

COLUMN 8 (cont.):

Line 12, should read: --17. A vibration type motor according to claim 16,--.
Line 17, change "17" to --18--.

Signed and Sealed this

Seventh Day of September, 1993

Attest:

BRUCE LEHMAN

Attesting Officer    Commissioner of Patents and Trademarks